United States Patent
Nakanishi et al.

(10) Patent No.: US 11,449,058 B2
(45) Date of Patent: Sep. 20, 2022

(54) TRAVELING TRACK DETERMINATION PROCESSING AND AUTOMATED DRIVE DEVICE

(71) Applicant: HONDA MOTOR CO., LTD., Tokyo (JP)

(72) Inventors: Kosuke Nakanishi, Wako (JP); Yuji Yasui, Wako (JP); Hideki Matsunaga, Wako (JP); Yuki Ichino, Wako (JP); Takeru Goto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 412 days.

(21) Appl. No.: 16/711,606

(22) Filed: Dec. 12, 2019

(65) Prior Publication Data

US 2020/0192384 A1  Jun. 18, 2020

(30) Foreign Application Priority Data

Dec. 17, 2018 (JP) .............................. JP2018-235388

(51) Int. Cl.
- *G05D 1/02* (2020.01)
- *G08G 1/01* (2006.01)
- *G08G 1/16* (2006.01)
- *G01C 21/34* (2006.01)
- *B62D 15/02* (2006.01)

(52) U.S. Cl.
CPC .......... *G05D 1/0212* (2013.01); *G08G 1/0112* (2013.01); *G05D 2201/0213* (2013.01)

(58) Field of Classification Search
CPC ......... G05D 1/0212; G05D 2201/0213; G08G 1/0112; G08G 1/165; G01C 21/34; B62D 15/025
See application file for complete search history.

(56) References Cited

U.S. PATENT DOCUMENTS

| 9,399,464 B2* | 7/2016 | Kunihiro .............. B60W 40/112 |
| 10,576,976 B2* | 3/2020 | Suto ........................ B60W 30/12 |
| 2020/0108833 A1* | 4/2020 | Sim ..................... B60W 40/072 |

(Continued)

FOREIGN PATENT DOCUMENTS

| CN | 102741109 A | 10/2012 |
| CN | 104411558 A | 3/2015 |
| CN | 108121339 A | 6/2018 |

(Continued)

OTHER PUBLICATIONS

Office Action dated Nov. 2, 2021, issued in counterpart JP Application No. 2018-235388, with English Translation. (8 pages).

(Continued)

*Primary Examiner* — Frederick M Brushaber
(74) *Attorney, Agent, or Firm* — WHDA, LLP

(57) ABSTRACT

A traveling track determination device includes an ECU. The ECU calculates a second course target point, and determines a future traveling track for the vehicle at right/left turn using a first straight line that extends from the vehicle through an intersection in a forward direction, a second straight line that extends along a second course through the second course target point and intersects with the first straight line in the intersection, and a curved track configured of a quadratic Bézier curve.

13 Claims, 9 Drawing Sheets

(56) References Cited

U.S. PATENT DOCUMENTS

2021/0166052 A1* 6/2021 Park .................... G06V 10/44

FOREIGN PATENT DOCUMENTS

| JP | 2006-273230 A | 10/2006 | | |
|---|---|---|---|---|
| JP | 2007-164339 A | 6/2007 | | |
| JP | 2008-196968 A | 8/2008 | | |
| JP | 2012-2753 A | 1/2012 | | |
| WO | WO-2011067252 A1 * | 6/2011 | .......... | B60W 30/045 |

OTHER PUBLICATIONS

Office Action dated Nov. 23, 2021, issued in counterpart CN Application No. 201910959152.7, with English Translation. (15 pages).

Office Action dated Jun. 8, 2022, issued in counterpart CN Application No. 201910959152.7, with English Translation. (7 pages).

* cited by examiner

TRAVELING TRACK DETERMINATION PROCESSING AND AUTOMATED DRIVE DEVICE

CROSS REFERENCES TO RELATED APPLICATIONS

The present application claims priority under 35 U.S.C. § 119 to Japanese Patent Application No. 2018-235388, filed Dec. 17, 2018, entitled "Traveling Track Determination Processing and Automated Drive Device." The contents of this application are incorporated herein by reference in their entirety.

TECHNICAL FIELD

The present disclosure relates to a traveling track determination device or the like that determines a future traveling track for a vehicle at traveling on a bent course.

BACKGROUND

An example of traveling track determination devices of the related art that determine a traveling track for a vehicle at traveling on a bent course is a navigation device described in Japanese Unexamined Patent Application Publication No. 2012-2753. The traveling track determination device illustrated in FIG. 7 in this document includes a storage unit and a control unit, and the storage unit includes a map database, a track curve file, and a road network database.

As illustrated in FIG. 8 in this document, the traveling track determination device acquires current position information, determines presence or absence of turn of a vehicle in the vicinity of an intersection on road network data based on the current position information, and when determining that the vehicle is turning, determines a traveling track curve. Specifically, if the traveling track curve corresponding to an entrance link and a leaving link of the intersection is stored in the track curve file, the traveling track curve is read from the track curve file, and if the corresponding traveling track curve is not stored in the track curve file, a curve line that is in contact with the entrance link and the leaving link is generated.

SUMMARY

It is disadvantageous that, since the traveling track determination device of the relater art determines the traveling track curve using the road network data, if data on the intersection into which the vehicle is ready to enter is not present in the road network data, the presence or absence of turn of the vehicle in the vicinity of the intersection is difficult to be determined, failing to determine the traveling track curve. In this case, course environment varies depending on construction work and so on, while there is a limitation on updating of the road network data to the current state at all times according to such change. As a result, the above-mentioned problem necessarily occurs in the traveling track determination device described in Japanese Unexamined Patent Application Publication No. 2012-2753.

The present disclosure provides a traveling track determination device that, when a vehicle travels on a bent course, properly determines a future traveling track even if there is no map data or the like.

A traveling track determination device of one aspect of the present disclosure is a traveling track determination device 1 that determines a future traveling track Xf for a vehicle 3 when the vehicle 3 travels from a first course 31 toward a second course 32 bent and connected to the first course 31, and includes: a second course target point acquisition unit (ECU 2, second course target point calculation part 11) that acquires a second course target point Xt that is a target on the second course 32; and a traveling track determination unit (ECU 2, traveling track calculation part 17) that determines the future traveling track Xf for the vehicle 3 using a first straight line L1 that extends from the vehicle 3 in a forward direction of the vehicle 3 through a continuous section (intersection 30) of the first course 31 and the second course 32, a second straight line L2 that extends along the second course 32 through the second course target point Xt and intersects with the first straight line L1 in the continuous section (intersection 30), a first small curved line section Xfb1 that extends, while being curved, from a first predetermined point X1 on the first straight line L1 such that a curvature of which gradually increases from a value smaller than a curvature of an arc inscribed in the first straight line L1 and the second straight line L2 in the continuous section (intersection 30), a large curved line section Xfb3 that is connected to one end of the first small curved line section Xfb1 and extends, while being curved, such that a curvature of which gradually increases to a maximum value larger than the curvature of the arc and gradually decreases from the maximum value, and a second small curved line section Xfb2 that is connected to one end of the large curved line section Xfb3 and extends, while being curved, to a second predetermined point X2 on the second straight line L2 such that a curvature of which gradually decreases from a value of a curvature of the one end of the large curved line section Xfb3 to a value smaller than the curvature of the arc, such that at least a portion of the first small curved line section Xfb1, at least a portion of the second small curved line section Xfb2, and the large curved line section Xfb3 are included in the continuous section (intersection 30).

The traveling track determination device acquires the second course target point that is the target on the second course. Further, the future traveling track for the vehicle is determined using the first straight line, the second straight line, the first small curved line section, the second small curved line section, and the large curved line section such that at least a portion of the first small curved line section, at least a portion of the second small curved line section, and the large curved line section are included in the continuous section. The first straight line extends from the vehicle in the forward direction of the vehicle through the continuous section of the first course and the second course, and the second straight line extends along the second course through the second course target point, and intersects with the first straight line in the continuous section.

Further, the first small curved line section extends, while being curved, from the first predetermined point on the first straight line such that its curvature gradually increases from the value smaller than the curvature of the arc inscribed in the first straight line and the second straight line in the continuous section, and the large curved line section is connected to one end of the first small curved line section, and extends, while being curved, such that its curvature gradually increases to the maximum value larger than the curvature of the arc and then gradually decreases the maximum value. In addition, the second small curved line section is connected to one end of the large curved line section, and extends, while being curved, to a second predetermined point on the second straight line such that its curvature gradually decreases from the value of the curvature of the one end of the large curved line section to the value smaller than the curvature of the arc. Accordingly, by using the first straight line, the second straight line, the first small curved line section, the second small curved line section, and the large curved line section, the future traveling track may be properly determined even in the absence of map data or the like.

Due to the shape of the first small curved line section, the future traveling track is determined to extend from the first predetermined point on the first straight line in the continuous section while being curved with the curvature smaller than the curvature of the arc inscribed in the first straight line and the second straight line. Accordingly, for example, in the case where the traffic division of the vehicle is prescribed as the left-hand traffic, when the vehicle turns in the intersection that is the continuous section according to the future traveling track determined as described above, as compared to the case where the future traveling track is determined to extend from the first predetermined point on the first straight line in the form of arc, the degree of closeness of the vehicle to the opposite lane in the intersection may be further suppressed. Further, when the vehicle turns to the left in the intersection that is the continuous section, as compared to the case where the future traveling track is determined to extend from the first predetermined point on the first straight line in the form of arc, the degree of closeness of the vehicle to the corner in the intersection due to the turning radius differential may be further suppressed.

Further, due to the shape of the second small curved line section, the future traveling track is determined to be connected to the second predetermined point on the second straight line while being curved with the curvature smaller than the curvature of the arc inscribed in the first straight line and the second straight line. Accordingly, for example, in the case where the traffic division of the vehicle is prescribed as the left-hand traffic, when the vehicle turns to the right in the intersection that is the continuous section according to the future traveling track determined as described above, as compared to the case where the future traveling track is determined to extend from the second predetermined point on the second straight line in the form of arc, the angle at which the vehicle reaches the second predetermined point of the second straight line may be decreased, thereby reducing a lateral G force applied to occupants when the vehicle enters into the second course.

According to other aspect of the present disclosure, preferably, a first boundary line acquisition unit (ECU 2) that acquires a first boundary line Lb1 defining a boundary between the first course 31 and the continuous section (intersection 30) is further provided, and the traveling track determination unit determines the future traveling track Xf such that the first predetermined point X1 on the first straight line L1 is displaced from a first intersection Xc1 that is an intersection of the first straight line L1 and the first boundary line Lb1 in the forward direction of the vehicle 3.

The traveling track determination device acquires a first boundary line defining a boundary between the first course and the continuous section, and determines the future traveling track such that the first predetermined point on the first straight line is displaced from a first intersection that is an intersection of the first straight line and the first boundary line in the forward direction of the vehicle. By determining the future traveling track in this manner, as compared to the case where the first predetermined point on the first straight line is the first intersection, the length of the first small curved line section may be decreased. Thus, when the vehicle turns to the right in the intersection as described above, the degree of closeness of the vehicle to the opposite lane in the intersection may be further suppressed. On the contrary, when the vehicle turns to the left in the intersection as described above, the degree of closeness of the vehicle to the corner in the intersection due to the turning radius differential may be further suppressed.

According to other aspect of the present disclosure, preferably, given that the intersection of the second straight line L2 and the first straight line L1 is a second intersection Xc2, the traveling track determination unit determines a displacement (first offset value Offset1) of the first predetermined point X1 from the first intersection Xc1 according to a distance (first distance D1) between the second intersection Xc2 and the first intersection Xc1.

The traveling track determination device may properly determine the position of the first predetermined point according to the distance between the second intersection and the first intersection, that is, size of the continuous section in the forward direction of the vehicle.

According to other aspect of the present disclosure, preferably, a second boundary line acquisition unit (ECU 2) that acquires a second boundary line Lb2 defining a boundary between the second course 32 and the continuous section (intersection 30) is further provided, and the traveling track determination unit determines the future traveling track Xf such that the second predetermined point X2 on the second straight line L2 is displaced from a third intersection (second course target point Xt) that is an intersection of the second straight line L2 and the second boundary line Lb2 toward a side opposite to the continuous section (intersection 30).

The traveling track determination device acquires a second boundary line defining a boundary between the second course and the continuous section, and determines the future traveling track such that the second predetermined point on the second straight line is displaced from a third intersection that is an intersection of the second straight line and the second boundary line toward a side opposite to the continuous section. By determining the future traveling track in this manner, as compared to the case where the second predetermined point on the second straight line is the third intersection, the length of the second small curved line section may be further increased. This may further decrease the angle at which the vehicle reaches the second predetermined point, thereby further reducing a lateral G force applied to occupants when the vehicle enters into the second course.

According to other aspect of the present disclosure, preferably, given that the intersection of the second straight line L2 and the first straight line L1 is a second intersection Xc2, the traveling track determination unit determines a displacement (second offset value Offset2) of the second predetermined point X2 from the third intersection (second course target point Xt) according to a distance (second distance D2) between the third intersection (second course target point Xt) and the second intersection Xc2.

The traveling track determination device may properly determine the second predetermined point according to the distance between the second intersection and the third intersection, that is, size of the continuous section in the extending direction of the second straight line.

According to other aspect of the present disclosure, preferably, the traveling track determination device further includes: a lane boundary area acquisition unit (ECU 2) that acquires a lane boundary area (median strip 32a) corresponding to a boundary area between a lane on which the vehicle 3 travels and an opposite lane on the second course 32; a surrounding status data acquisition unit (status detection device 4) that acquires surrounding status data D_info indicating a surrounding status of the traveling vehicle 3 when the vehicle 3 actually travels such that a traveling track Xf for the vehicle 3 becomes the future traveling track Xf after determination of the future traveling track Xf; and a traveling track change unit (ECU 2) that changes the future traveling track Xf so as to avoid interference of the vehicle 3 with the lane boundary area (median strip 32a) when it is determined that the lane boundary area (median strip 32a) is present in the forward direction of the vehicle 3 based on the acquired surrounding status data D_info.

The traveling track determination device acquires the lane boundary area corresponding to the boundary area between the lane on which the vehicle travels and the opposite lane on the second course, and acquires the surrounding status data indicating the surrounding status of the traveling vehicle when the vehicle actually travels such that the traveling track for the vehicle becomes the future traveling track after determination of the future traveling track. Then, the future traveling track is changed so as to avoid interference of the vehicle with the lane boundary area when it is determined that the lane boundary area is present in the forward direction of the vehicle based on the acquired surrounding status data. Thus, for example, when a structure having a height, such as a median strip, is present in the lane boundary area, contact of the vehicle with the structure may be avoided.

According to other aspect of the present disclosure, preferably, when the vehicle 3 travels toward the second course 32 while the vehicle crosses an opposite lane of the first course 31 in the continuous section (intersection 30), if the lane boundary area (median strip 32a) is present in the forward direction of the vehicle 3, the traveling track change unit determines a point closer to the intersection of the second straight line L2 and the first straight line L1 than the second predetermined point X2 on the second straight line L2 as a third predetermined point (interference avoidance point X3), and changes the future traveling track Xf to a track (curved track Xf') connecting a straight track between the vehicle 3 and the third predetermined point (interference avoidance point X3) to a straight track between the third predetermined point and the second predetermined point X2.

In the case where the vehicle travels toward the second course while crossing the opposite lane on the first course in the continuous section, when the lane boundary area is present in the forward direction of the vehicle, the traveling track determination device determines the point that is closer to the intersection of the second straight line and the first straight line than the second predetermined point on the second straight line as the third predetermined point. Simultaneously, since the future traveling track is changed to the track connecting the straight track between the vehicle and the third predetermined point to the straight track between the third predetermined point and the second predetermined point, by simply combining the two straight tracks, the future traveling track may be easily changed so as to avoid interference of the vehicle with the lane boundary area.

According to other aspect of the present disclosure, preferably, the first small curved line section Xfb1, the large curved line section Xfb3, and the second small curved line section Xfb2 are configured of a Bézier curve.

In the traveling track determination device, since the first small curved line section, the large curved line section, and the second small curved line section are configured as the Bézier curve, the curved line sections may be easily determined by an equation.

An automated drive device 1 of the present disclosure may include any of the above-mentioned traveling track determination devices 1, and a control unit (ECU 2) that controls a traveling state of the vehicle 3 using the future traveling track Xf.

The automated drive device controls the traveling state of the vehicle using the future traveling track determined as described above. Therefore, when the vehicle travels on a bent course, the traveling state of the vehicle may be smoothly controlled even if there is no map data or the like. In the above explanation of the exemplary embodiment, specific elements with their reference numerals are indicated by using brackets. These specific elements are presented as mere examples in order to facilitate understanding, and thus, should not be interpreted as any limitation to the accompanying claims.

BRIEF DESCRIPTION OF THE DRAWINGS

The advantages of the disclosure will become apparent in the following description taken in conjunction with the following drawings.

DETAILED DESCRIPTION

Hereinafter, with reference to the figures, a traveling track determination device and an automated drive device according to an embodiment of the present disclosure are described. The automated drive device in this embodiment also serves as the traveling track determination device. Thus, in the following description of the automated drive device, functions and configuration of the traveling track determination device are also described.

Figure 1:
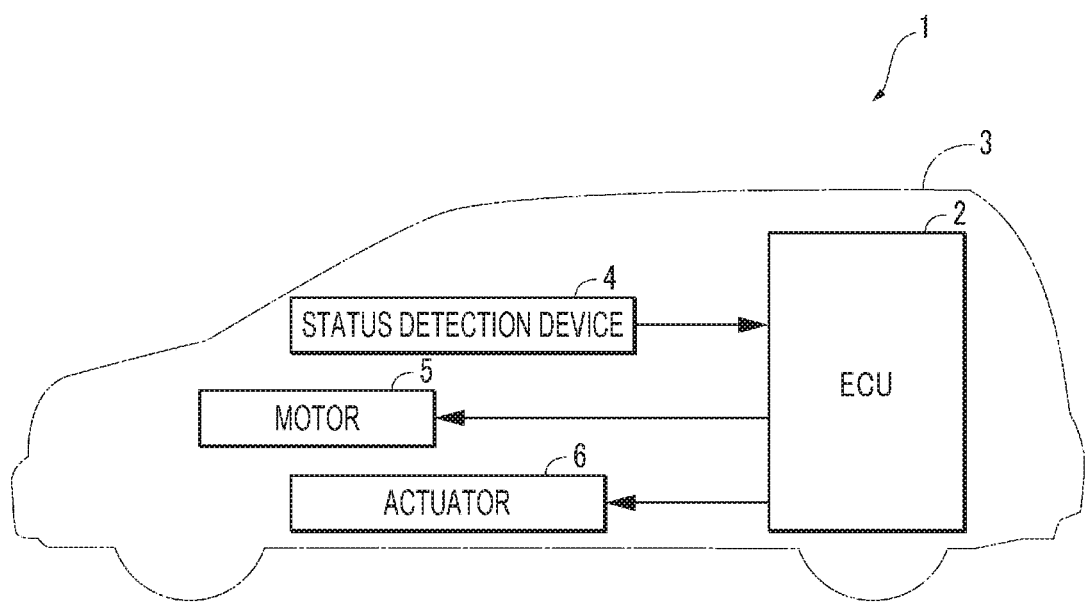
FIG. 1 is a schematic view illustrating the configuration of an automated drive device and an automated drive vehicle to which the automated drive device is applied, according to an embodiment of the present disclosure.

As illustrated in FIG. 1, an automated drive device 1 is applied to a four-wheeled vehicle 3 and includes an ECU 2. A status detection device 4, a motor 5, and an actuator 6 are electrically connected to the ECU 2.

The status detection device 4 (surrounding status data acquisition unit) is configured of a camera, a millimeter-wave radar, an LIDAR, a sonar, a GPS, and various sensors, and outputs surrounding status data D_info indicating the position of the vehicle 3 and the surrounding status (traffic environment, traffic participants, and so forth) in the forward direction of the vehicle 3 to the ECU 2.

As described later, the ECU 2 recognizes the position of the vehicle 3 and the traffic environment surrounding the vehicle 3 based on the surrounding status data D_info sent from the status detection device 4, to determine a future traveling track Xf for the vehicle 3. In the following description, the future traveling track Xf is simply referred to as "traveling track Xf".

The motor 5 is constituted of, for example, an electric motor. As described later, when determining the traveling track Xf for the vehicle 3, the ECU 2 controls the output of the motor 5 such that the vehicle 3 travels along the traveling track Xf.

The actuator 6 is constituted of a braking actuator and a steering actuator. As described later, when determining the traveling track Xf for the vehicle 3, the ECU 2 controls the operation of the actuator 6 such that the vehicle 3 travels along the traveling track Xf.

On the contrary, the ECU 2 is constituted of a microcomputer including a CPU, a RAM, a ROM, an E2PROM, an I/O interface, various electric circuits, and the like (not illustrated). As described later, the ECU 2 executes various types of control processing such as traveling track calculation processing for right/left-turn based on the above-described surrounding status data D_info sent from the status detection device 4.

In this embodiment, the ECU 2 corresponds to a second course target point acquisition unit, a traveling track determination unit, a first boundary line acquisition unit, a second boundary line acquisition unit, a lane boundary area acquisition unit, a traveling track change unit, and a control unit.

Figure 2:
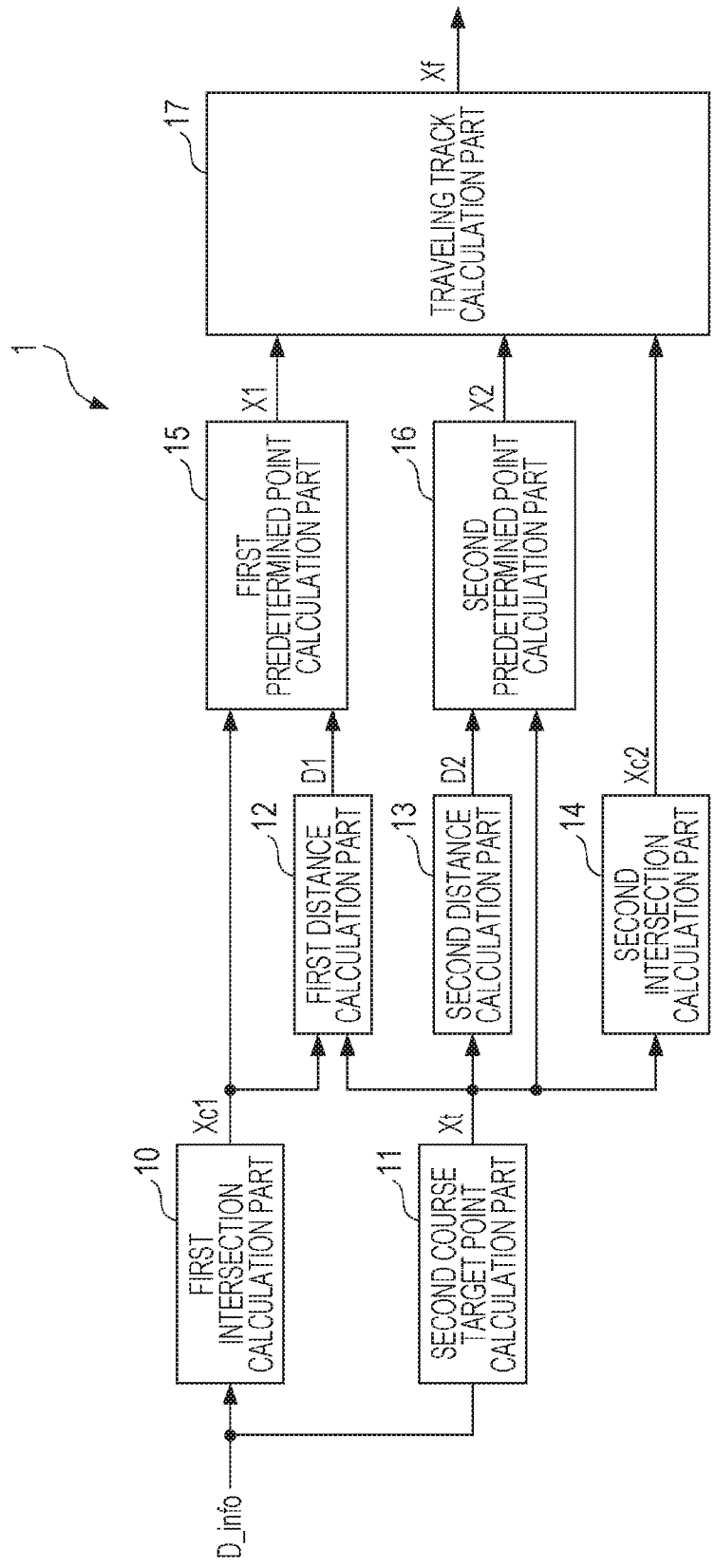
FIG. 2 is a block diagram illustrating the functional configuration of the automated drive device.
Figure 3:
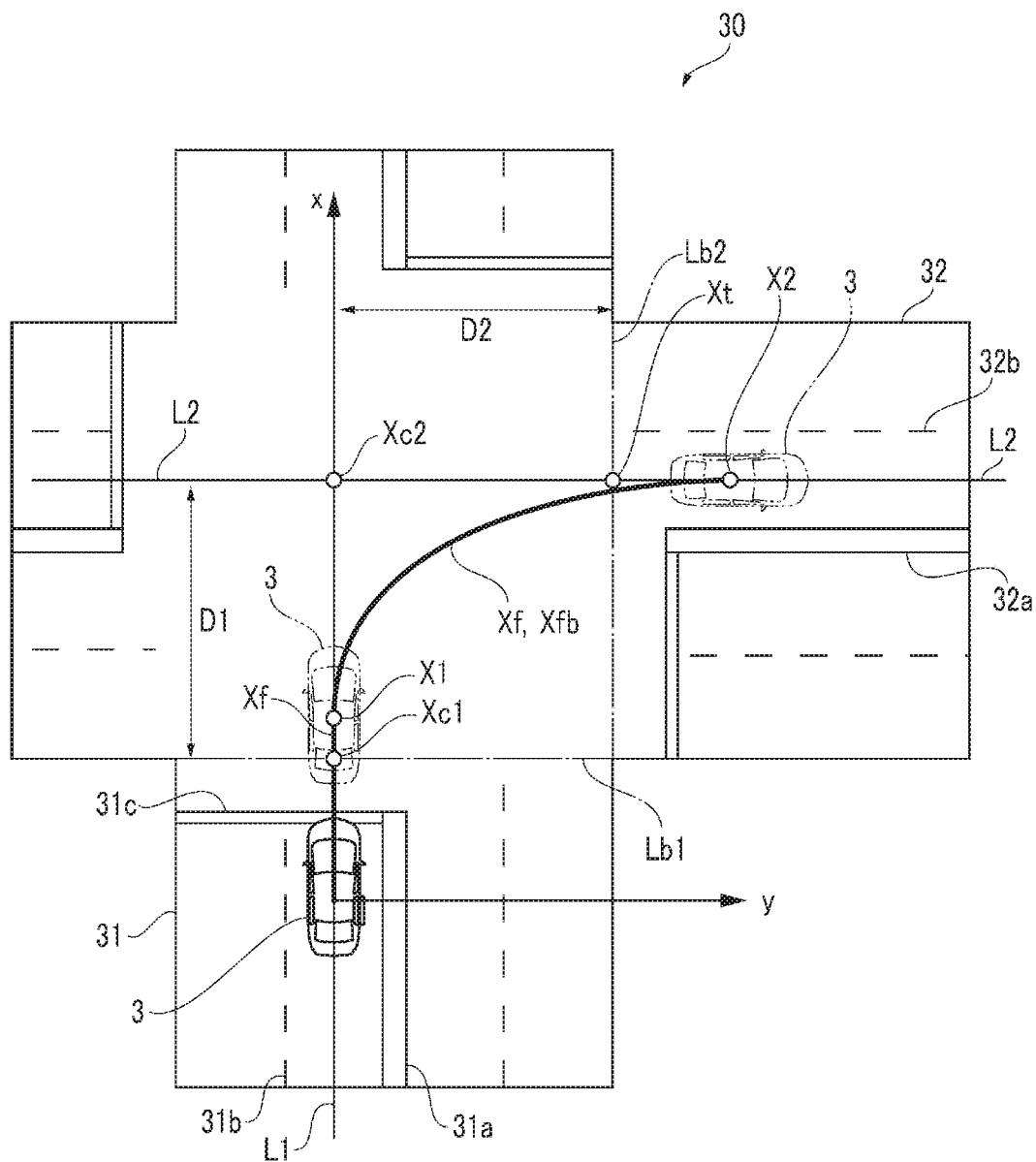
FIG. 3 is a view illustrating a method of calculating a traveling track at right turn in an intersection.
Figure 4:
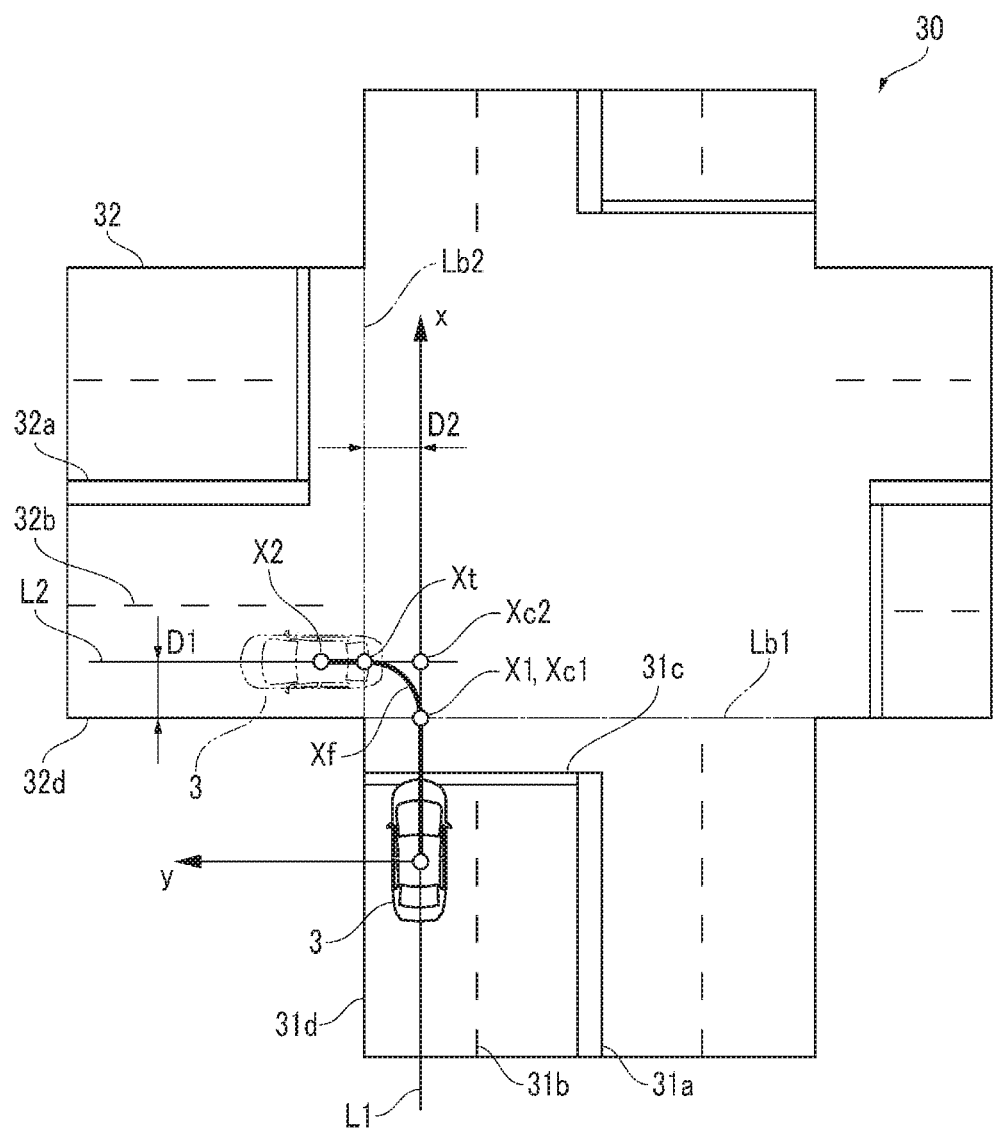
FIG. 4 is a view illustrating a method of calculating the traveling track at left turn in the intersection.

Next, with reference to FIGS. 2 to 4, the functional configuration of the automated drive device 1 in this embodiment is described. The automated drive device 1 calculates the traveling track Xf, for example, at right turn/left turn in an intersection according to a below-mentioned calculation algorithm. In the following description, the traffic division of the vehicle 3 is prescribed as the left-hand traffic.

As illustrated in FIG. 2, the automated drive device 1 includes a first intersection calculation part 10, a second course target point calculation part 11, a first distance calculation part 12, a second distance calculation part 13, a second intersection calculation part 14, a first predetermined point calculation part 15, a second predetermined point calculation part 16, and a traveling track calculation part 17, and these components 10 to 17 are specifically configured of the ECU 2.

First, with reference to FIG. 3, a method of calculating the traveling track Xf in the case where the vehicle 3 turns to the right in an intersection 30 (continuous section) of a crossroad is described. In the intersection 30, a course 31 on which the vehicle 3 currently travels before starting right turn in the intersection 30 is orthogonal to a course 32 to be traveled after the right turn. In the following description, the course 31 on which the vehicle 3 currently travels is referred to as "first course 31", and the course 32 to be traveled after the right turn is referred to as "second course 32".

Further, as illustrated in the figure, the vehicle 3 turns to the right from a traveling lane between a median strip 31a and a lane boundary line 31b indicated by a broken line on the first course 31 toward a traveling lane between a median strip 32a (lane boundary area) and a lane boundary line 32b indicated by a broken line on the second course 32 across a stop line 31c.

In this case, assuming that around the center of the vehicle 3 is an origin, the forward direction of the vehicle 3 is an x axis, and a direction orthogonal to the x axis is a y axis, the traveling track Xf (Xf_x, Xf_y) is calculated using a combination of an x coordinate value and a y coordinate value as relative coordinates of the vehicle 3. At right turn, the x axis coordinate value becomes a larger positive value as the vehicle travels in the forward direction, and the y axis coordinate value becomes a larger positive value as the vehicle travels to the right. In the following description, a straight line that extends along the x axis is defined as a first straight line L1.

First, the first intersection calculation part 10 is described. The first intersection calculation part 10 acquires a first boundary line Lb1 indicating the boundary between the intersection 30 and the first course 31 based on the surrounding status data D_info, and calculates an intersection between the first boundary line Lb1 and the first straight line L1 (that is, the x axis) as a first intersection Xc1 (Xc1_x, Xc1_y). In this case, a y coordinate value Xc1_y of the first intersection Xc1 becomes 0.

The second course target point calculation part 11 acquires a second boundary line Lb2 indicating the boundary between the intersection 30 and the second course 32 based on the surrounding status data D_info, and calculates a point located at the center of the lane on which the vehicle 3 travels on the second course 32, as a second course target point Xt (Xt_x, Xt_y) on the second boundary line Lb2. In this embodiment, the second course target point calculation part 11 corresponds to the second course target point acquisition unit, and the second course target point Xt corresponds to a third intersection.

Further, in the first distance calculation part 12, given that a straight line that passes the second course target point Xt and is parallel to the second course 32 is a second straight line L2, an interval between the second straight line L2 and the first boundary line Lb1 is calculated as a first distance D1. That is, the first distance D1 is calculated as a difference between the x coordinate value Xt_x of the second course target point Xt and the x coordinate value Xc1_x of the first intersection Xc1 (D1=Xt_x−Xc1_x).

On the contrary, the second distance calculation part 13 calculates an interval between the second course target point Xt and the first straight line L1 is calculated as a second distance D2. That is, the second distance D2 is calculated as the y coordinate value Xt_y of the second course target point Xt (D2=Xt_y).

The second intersection calculation part 14 calculates an intersection of the first straight line L1 and the second straight line L2 as a second intersection Xc2 (Xc2_x, Xc2_y). In this case, the x coordinate value Xc2_x of the second intersection Xc2 becomes equal to the x coordinate value Xt_x of the second course target point Xt (Xc2_x=Xt_x). Since the second intersection Xc2 is located on the x axis, the y coordinate value Xc2_y becomes 0.

Further, the first predetermined point calculation part 15 calculates a first predetermined point X1 (X1_x, X1_y) as described below. First, a first offset value Offset1 is calculated by searching a map not illustrated according to the first distance D1. In the map, the first offset value Offset1 is set to fall within a range from a value 0 to a predetermined value (for example, 2 m) and more specifically, to be larger as the first distance D1 increases.

Subsequently, the x coordinate value X1_x of the first predetermined point X1 is calculated as a sum of the x coordinate value Xc1_x of the first intersection Xc1 and the first offset value Offset1 (X1_x=Xc1_x+Offset1). Since the first predetermined point X1 is located on the x axis, the y coordinate value X1_y becomes 0.

On the contrary, the second predetermined point calculation part 16 calculates a second predetermined point X2 (X2_x, X2_y) as described below. First, a second offset value Offset2 is calculated by searching a map not illustrated according to the second distance D2. In the map, the second offset value Offset2 is set to fall in a range from a value 0 to a predetermined value (for example, 2 m) and more specifically, to be larger as the second distance D2 increases. At right turn, the second offset value Offset2 is calculated as the above-mentioned predetermined value or its approximate value.

Subsequently, the y coordinate value X2_y of the second predetermined point X2 is calculated as a sum of the y coordinate value Xt_y of the second course target point Xt and the second offset value Offset2 (X2_y=Xt_y+Offset2). Since the second predetermined point X2 is located on the second straight line L2, the x coordinate value X2_x becomes equal to the x coordinate value Xt_x of the second course target point Xt (X2_x=Xt_x).

Further, the traveling track calculation part 17 (traveling track determination unit) first calculates a curved track Xfb (Xfb_x, Xfb_y) as a quadratic Bézier curve using the first predetermined point X1, the second predetermined point X2, and the second intersection Xc2 as three control points, according to following equations (1) and (2). t in the following equations (1) and (2) is a parameter that continuously changes in a range of 0≤t≤1.

$$Xfb\_x(t)=X1\_x \cdot (1-t)^2 + Xc2\_x \cdot 2t \cdot (t-1) + X2 \cdot x \cdot t^2 \quad (1)$$

$$Xfb\_y(t)=X1\_y \cdot (1-t)^2 + Xc2\_y \cdot 2t \cdot (t-1) + X2\_y \cdot t^2 \quad (2)$$

Then, the traveling track Xf at right turn in the intersection 30 is calculated as a track connecting a straight track between the first intersection Xc1 and the first predetermined point X1 to the curved track Xfb.

Next, with reference to FIG. 4, a method of calculating the traveling track Xf in the case where the vehicle 3 turns to the left in the intersection 30 is described. As illustrated in the figure, the vehicle 3 turns to the left from a traveling lane between an outer boundary line 31*d* and the lane boundary line 31*b* indicated by a broken line on the first course 31 toward a traveling lane between an outer boundary line 32*d* and the lane boundary line 32*b* indicated by a broken line on the second course 32 across the stop line 31*c*.

In the automated drive device 1, the method of calculating the traveling track Xf is substantially same at left turn and right turn, except for only some matters. The different matters are described below.

First, at left turn as opposed to right turn, the y axis coordinate value of the relative coordinates of the vehicle 3 is calculated to become a larger positive value as the vehicle 3 travels to the left. The y axis of the relative coordinates of the vehicle 3 at left turn may be set in the same manner as that at right turn, and in various calculations, an absolute y axis coordinate value may be used.

The first distance D1 at left turn is calculated to be much smaller than the first distance D1 at right turn. Therefore, the first predetermined point calculation part 15 calculates the first offset value Offset1 as 0, so that the first intersection Xc1 and the first predetermined point X1 are located at the same position. Thus, the traveling track Xf is calculated as the same track as the curved track Xfb.

Further, the second distance D2 at left turn is also calculated to be much smaller than the second distance D2 at right turn. Therefore, the second predetermined point calculation part 16 calculates the second offset value Offset2 as a value that is smaller than the value at right turn (for example, 1 m).

The method of calculating the traveling track Xf at left turn in the intersection 30 is different from the method of calculating the traveling track Xf at right turn in the above-described matters.

Figure 5:
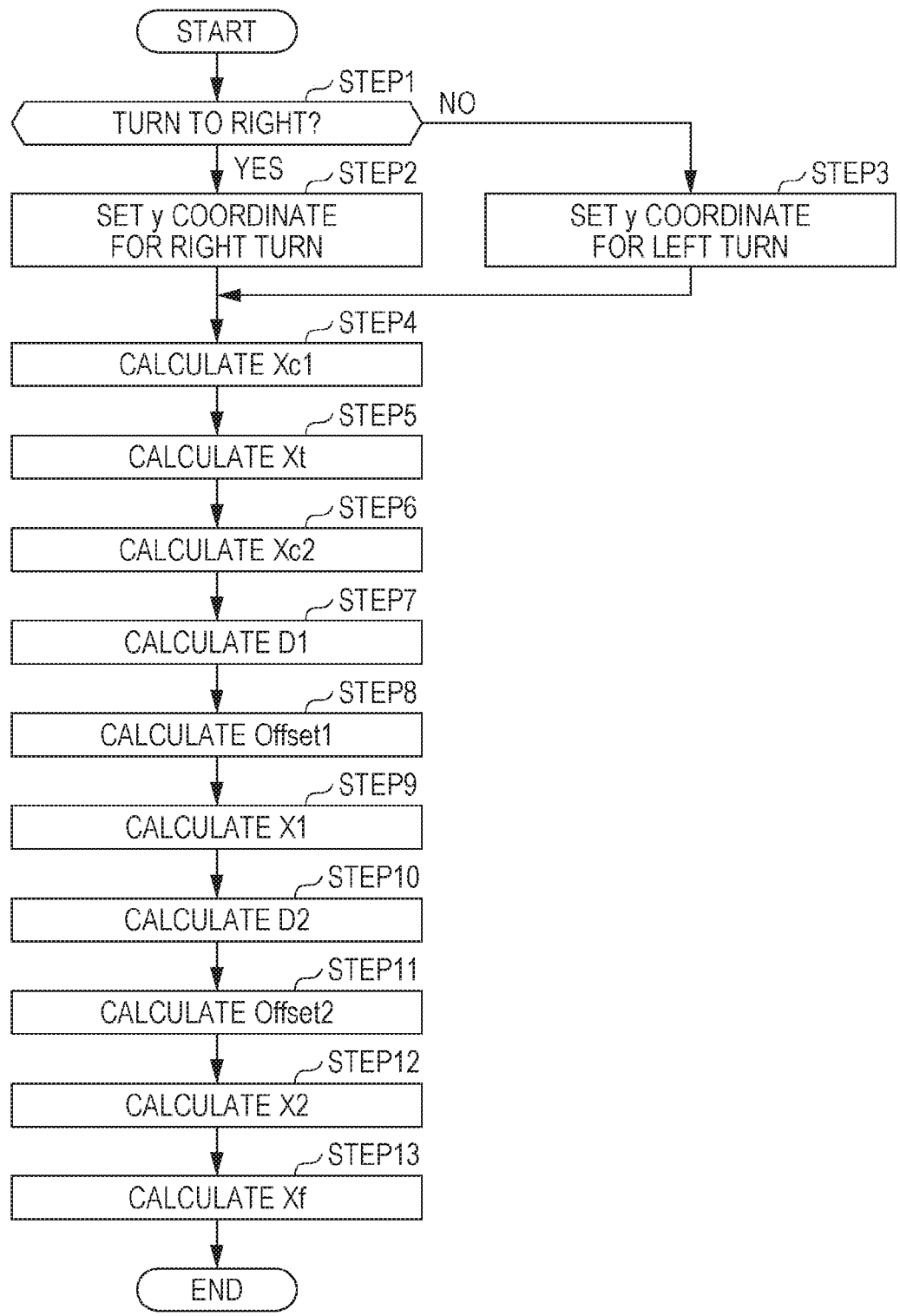
FIG. 5 is a flow chart illustrating traveling track calculation processing for right/left-turn.

Next, with reference to FIG. 5, traveling track calculation processing for right/left-turn is described. The ECU 2 executes the traveling track calculation processing to calculate the traveling track Xf for right/left turn or the like by the above-mentioned calculation method at a predetermined control cycle. Various values calculated in the following description are stored in the E2PROM of the ECU 2.

As illustrated in the figure, first, it is determined whether or not the vehicle 3 turns to the right in the intersection based on the surrounding status data D_info sent from the status detection device 4 (FIG. 5/STEP 1).

If the determination is YES (FIG. 5/STEP 1: YES), the y coordinate value for right turn is set (FIG. 5/STEP 2). That is, as described above, at right turn, the y axis coordinate value of the relative coordinates of the vehicle 3 is set to become a larger positive value as the vehicle 3 travels to the right.

On the contrary, if the determination is NO (FIG. 5/STEP 1: NO), that is, at left turn, the y coordinate value for left turn is set (FIG. 5/STEP 3). That is, at left turn, as described above, the y axis coordinate value of the relative coordinates of the vehicle 3 is set to become a larger positive value as the vehicle 3 travels to the left.

Subsequently, the first intersection Xc1 (Xc1_x, Xc1_y) is calculated based on the surrounding status data D_info by the above-mentioned method (FIG. 5/STEP 4). After that, the second course target point Xt (Xt_x, Xt_y) is calculated based on the surrounding status data D_info by the above-mentioned method (FIG. 5/STEP 5).

Subsequently, the second intersection Xc2 (Xc2_x, Xc2_y) is calculated by the above-mentioned method (FIG. 5/STEP 6). That is, the x coordinate value Xc2_x of the second intersection Xc2 is calculated to be equal to the x coordinate value Xt_x of the second course target point Xt, and the y coordinate value Xc2_y of the second intersection Xc2 is calculated as 0. After that, as described above, the first distance D1 is calculated as a difference between the x coordinate value Xt_x of the second course target point Xt and the x coordinate value Xc1_x of the first intersection Xc1 (FIG. 5/STEP 7).

Subsequently, as described above, the first offset value Offset1 is calculated by searching a map according to the first distance D1 (FIG. 5/STEP 8). After that, the first predetermined point X1 (X1_x, X1_y) is calculated by the above-mentioned method (FIG. 5/STEP 9). That is, the x coordinate value X1_x of the first predetermined point X1 is calculated as the value Xc1_x+Offset1, and the y coordinate value X1_y of the first predetermined point X1 is calculated as 0.

Next, as described above, the second distance D2 is calculated as the y coordinate value Xt_y of the second course target point Xt (FIG. 5/STEP 10). After that, as described above, the second offset value Offset2 is calculated by searching a map according to the second distance D2 (FIG. 5/STEP 11).

Subsequently, the second predetermined point X2 (X2_x, X2_y) is calculated by the above-mentioned method (FIG. 5/STEP 12). That is, the y coordinate value X2_y of the second predetermined point X2 is calculated as the value Xt_y+Offset2, and the x coordinate value X2_x of the second predetermined point X2 is calculated to be equal to the x coordinate value Xt_x of the second course target point Xt.

Next, the traveling track Xf (Xf_x, Xf_y) is calculated (FIG. 5/STEP 13). In this case, as described above, at right turn, the traveling track Xf is calculated as a track connecting the straight track between the first intersection Xc1 and the first predetermined point X1 to the curved track Xfb calculated by the above-mentioned equations (1) and (2). On the contrary, at left turn, the traveling track Xf is calculated as the curved track Xfb. In this manner, the traveling track Xf (Xf_x, Xf_y) is calculated and then, the present processing is terminated.

Figure 6:
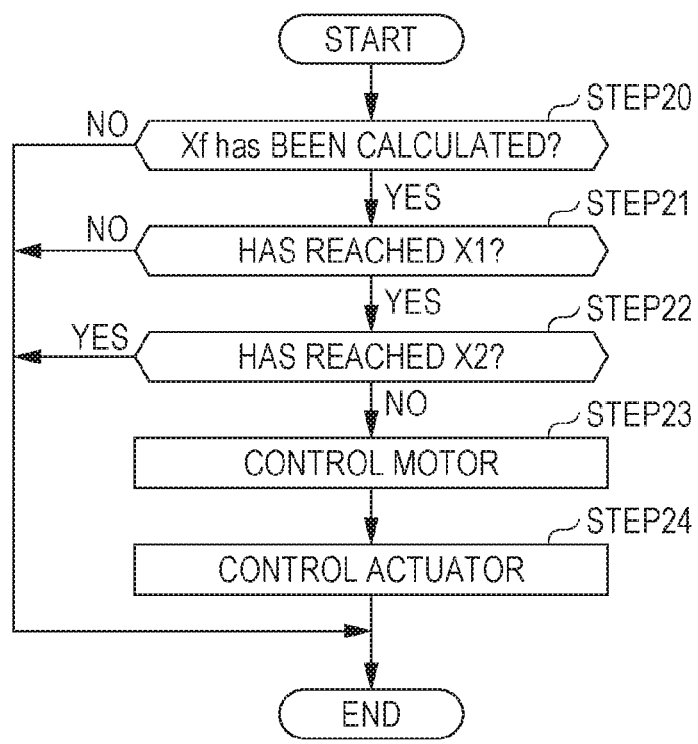
FIG. 6 is a flow chart illustrating automated drive control processing for right/left turn.

Next, with reference to FIG. 6, automated drive control processing for right/left turn is described. The ECU 2 executes the control processing to control the motor 5 and the actuator 6 such that the vehicle 3 travels on the traveling track Xf calculated as described above at a predetermined control cycle that is longer than the calculation cycle of the traveling track Xf.

As illustrated in the figure, first, it is determined whether or not the traveling track Xf for right/left turn has been calculated (FIG. 6/STEP 20). If the determination is NO (FIG. 6/STEP 20: NO), the present processing is terminated as it is.

On the contrary, if the determination is YES (FIG. 6/STEP 20: YES), that is, the traveling track Xf for right/left turn has been calculated, it is determined whether or not the vehicle 3 has reached the first intersection Xc1 (FIG. 6/STEP 21).

If the determination is NO (FIG. 6/STEP 21: NO), the present processing is terminated as it is. On the contrary, if the determination is YES (FIG. 6/STEP 21: YES), that is, the vehicle 3 has reached the first intersection Xc1, it is determined whether or not the vehicle 3 has reached the second predetermined point X2 (FIG. 6/STEP 22).

If the determination is YES (FIG. 6/STEP 22: YES), the present processing is terminated as it is. On the contrary, If the determination is NO (FIG. 6/STEP 22: NO), that is, the vehicle 3 has reached first intersection Xc1 and has not reached second predetermined point X2, the motor 5 is controlled such that the vehicle 3 travels on the traveling track Xf (FIG. 6/STEP 23).

Subsequently, the actuator 6 is controlled such that the vehicle 3 travels on the traveling track Xf (FIG. 6/STEP 24). After that, the present processing is terminated.

Next, changed track calculation processing during right turn and changed track control processing during right turn of the automated drive device 1 in this embodiment are described. First, with reference to FIG. 7, the principles of the processing are described.

Figure 7:
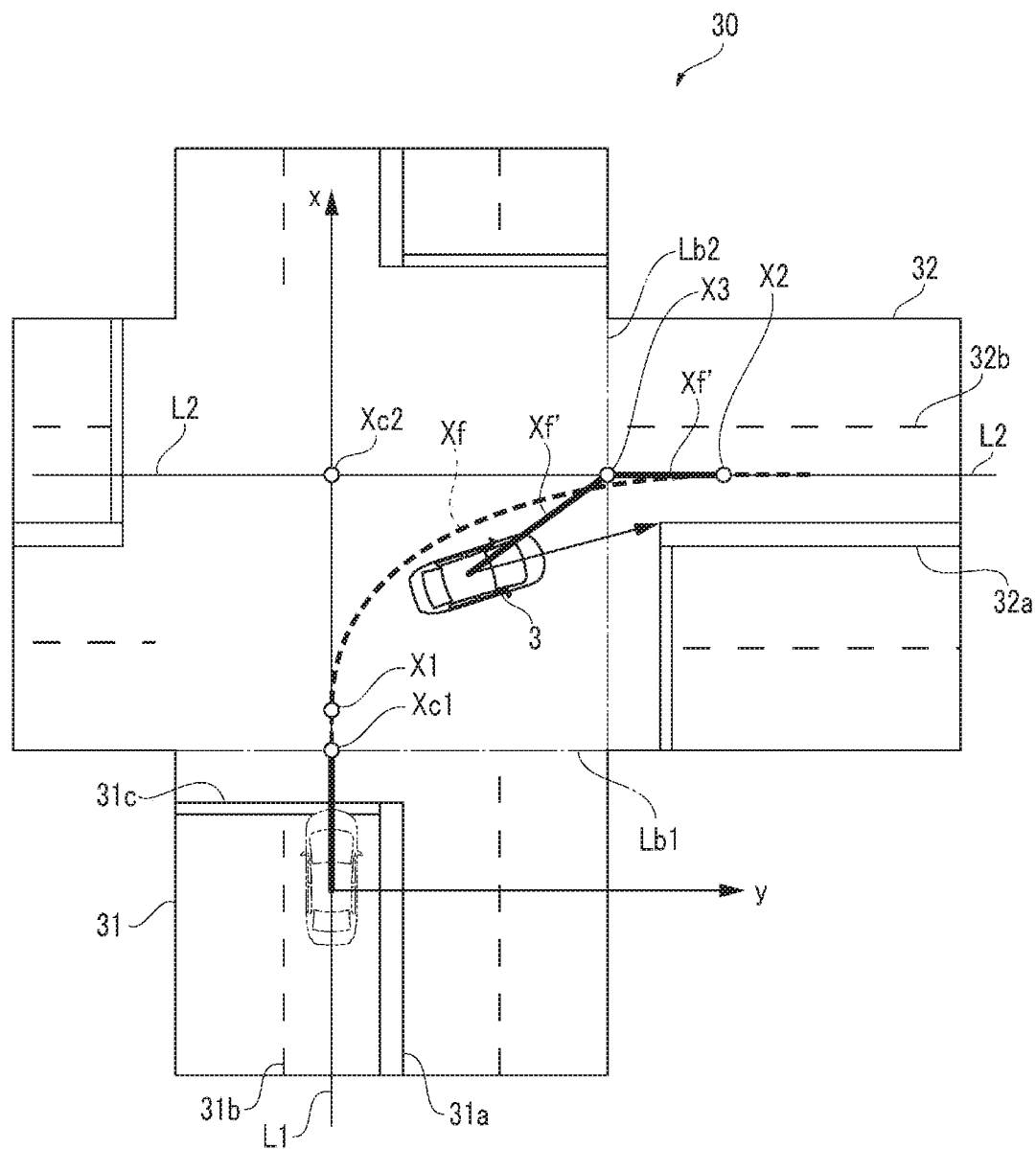
FIG. 7 is a view illustrating a method of calculating a changed track during right turn.

For example, in the case where the vehicle 3 turns to the right in the intersection 30, when the traveling track Xf for right turn is calculated as represented by a broken line in FIG. 7 and then, the automated drive control processing for right/left turn is executed, as illustrated in FIG. 7, the vehicle 3 may travel off the traveling track Xf for some reason.

When the vehicle 3 travels off the traveling track Xf, the automated drive device 1 may recognize that an obstacle such as the median strip 32a is present in the forward direction of the vehicle 3 based on the surrounding status data D_info sent from the status detection device 4. In this case, if the vehicle 3 continues to travel, the vehicle 3 can interfere with the obstacle. In this case, any object that has some height and must be avoided by the vehicle 3, such as the median strip 32a, corresponds to the obstacle, and any object that may be stepped over by the vehicle 3 without any problem, such as a white line, does not correspond to the obstacle.

When recognizing that the obstacle such as the median strip 32a is present in the forward direction of the vehicle 3 as describe above, the automated drive device 1 calculates a changed track Xf' as described below to avoid the obstacle. First, in place of the second predetermined point X2 at calculation of the traveling track Xf, an interference avoidance point X3 (third predetermined point) is calculated. The interference avoidance point X3 is located on the second straight line L2 and closer to the intersection 30 than the second predetermined point X2, and is calculated such that the vehicle 3 can avoid interference with the median strip 32a that is the obstacle while travelling toward the interference avoidance point X3.

Subsequently, the changed track Xf' is calculated as a track connecting the straight track between the vehicle 3 and the interference avoidance point X3 to the straight track between the interference avoidance point X3 and the second predetermined point X2. After that, the motor 5 and the actuator 6 are controlled such that the vehicle 3 travels on the changed track Xf'. This may avoid interference between the vehicle 3 and the median strip 32a.

Figure 8:
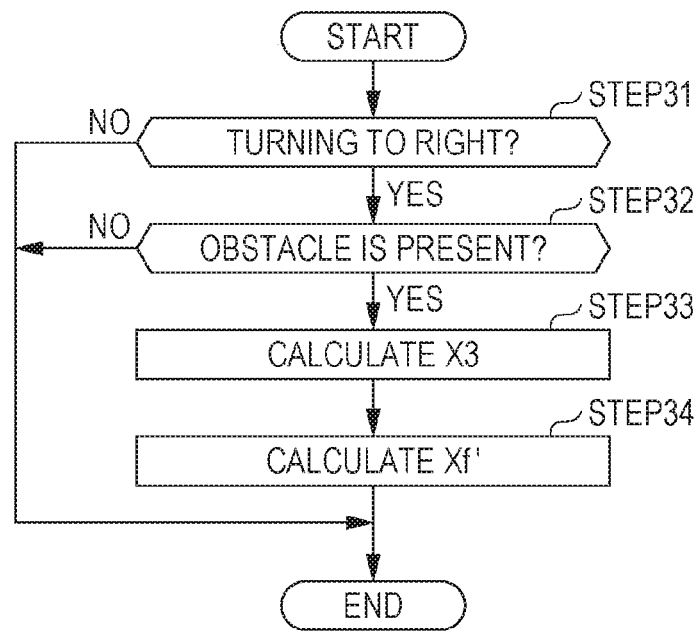
FIG. 8 is a flow chart illustrating changed track calculation processing during right turn.

Next, with reference to FIG. 8, the changed track calculation processing during right turn is described. The ECU 2 executes the processing to calculate the changed track Xf' at the same control cycle as the calculation cycle of the traveling track Xf.

As illustrated in the figure, first, it is determined whether or not the vehicle 3 is turning to the right (FIG. 8/STEP 31). If the determination is NO (FIG. 8/STEP 31: NO), the present processing is terminated as it is.

On the contrary, the determination is YES (FIG. 8/STEP 31: YES) and the vehicle 3 is turning to the right, it is determined whether or not the obstacle such as the median strip 32a is present in front of the vehicle 3 based on the surrounding status data D_info (FIG. 8/STEP 32).

If the determination is NO (FIG. 8/STEP 32: NO), the present processing is terminated as it is. On the contrary, if the determination is YES (FIG. 8/STEP 32: YES) and the obstacle such as the median strip 32a is present in front of the vehicle 3, the interference avoidance point X3 is calculated by the above-described method (FIG. 8/STEP 33).

Subsequently, as described above, the changed track Xf' is calculated as a track connecting the straight track between the vehicle 3 and the interference avoidance point X3 to the straight track between the interference avoidance point X3 and the second predetermined point X2 (FIG. 8/STEP 34). After that, the present processing is terminated.

Figure 9:
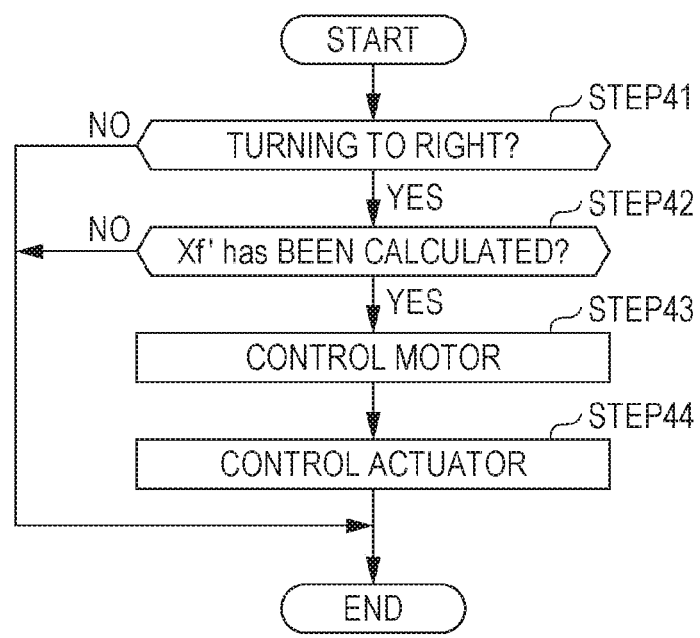
FIG. 9 is a flow chart illustrating changed track control processing during right turn.

Next, with reference to FIG. 9, the changed track control processing during right turn is described. The ECU 2 executes the processing to control the motor 5 and the actuator 6 such that the vehicle 3 travels on the changed track Xf' calculated as described above at the same control cycle as the cycle of the automated drive control processing for right/left turn.

As illustrated in the figure, first, it is determined whether or not vehicle 3 is turning to the right (FIG. 9/STEP 41). If the determination is NO (FIG. 9/STEP 41: NO), the present processing is terminated as it is.

On the contrary, if the determination is YES (FIG. 8/STEP 41: YES) and the vehicle 3 is turning to the right, it is determined whether or not changed track Xf' has been calculated (FIG. 8/STEP 42). If the determination is NO (FIG. 9/STEP 42: NO), the present processing is terminated as it is.

On the contrary, if the determination is YES (FIG. 9/STEP 42: YES) and the changed track Xf' has been calculated, the motor 5 is controlled such that the vehicle 3 travels on the changed track Xf' (FIG. 9/STEP 43).

Subsequently, the actuator 6 is controlled such that the vehicle 3 travels on the changed track Xf' (FIG. 9/STEP 44). After that, the present processing is terminated.

As described above, the automated drive device 1 in this embodiment calculates, based on the surrounding status data D_info, the traveling track Xf at right turn in the intersection 30 as the track connecting the straight track between the first intersection Xc1 and the first predetermined point X1 to the curved track Xfb, and calculates the traveling track Xf at left turn in the intersection 30 as the curved track Xfb. Since the curved track Xfb is calculated as the quadratic Bézier curve using the first predetermined point X1, the second predetermined point X2, and the second intersection Xc2 as the three control points by the equations (1) and (2), the traveling track Xf may be properly determined even if there is no map data.

Figure 10:
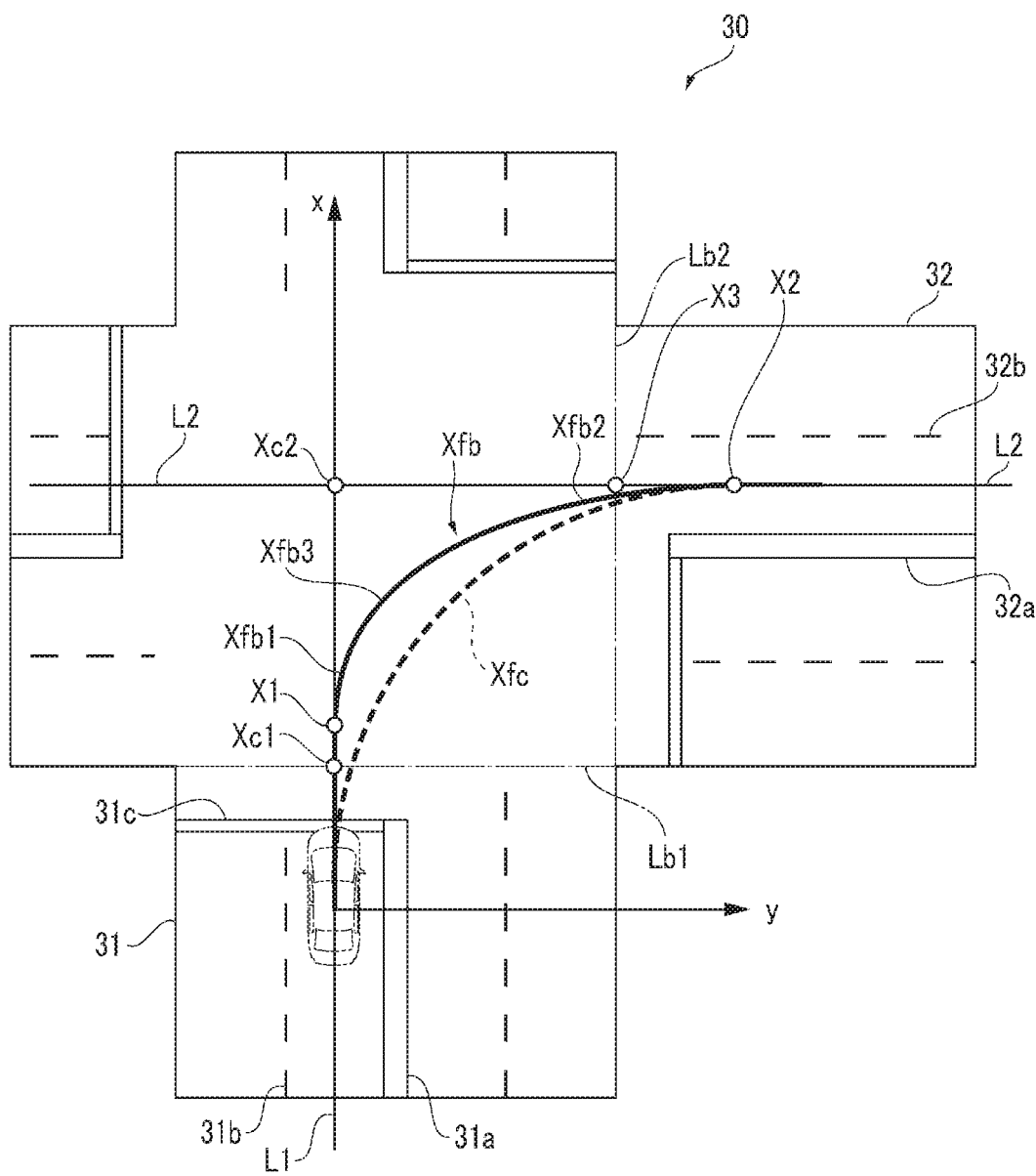
FIG. 10 is a view illustrating a difference between a curved track and an arc track.

The curved track Xfb of the traveling track Xf is the quadratic Bézier curve and thus, as illustrated in FIG. 10, is configured of a first small curved line section Xfb1 extending, while being curved, from the first predetermined point X1, a large curved line section Xfb3 continuously extending, while being curved, from the first small curved line section Xfb1, and a second small curved line section Xfb2 continuously extending, while being curved, from the large curved line section Xfb3 to the second predetermined point X2.

When the curved track Xfb is compared with an arc track Xfc as represented by a broken line in FIG. 10, which extends from the first straight line L1 and merges with the second straight line L2 at the second predetermined point X2, there is a following difference between the tracks.

That is, the first small curved line section Xfb1 of the curved track Xfb in this embodiment is configured to extend such that its curvature gradually increases from the curvature of the arc track Xfc, and the large curved line section Xfb3 is configured to extend, while being curved, such that its curvature gradually increased to a maximum value larger than the curvature of the arc track Xfc and gradually decreases from the maximum value. Further, the second small curved line section Xfb2 is configured to extend such that its curvature gradually decreases to a value smaller than the curvature of the arc track Xfc.

Due to the above-mentioned shape of the first small curved line section Xfb1, in the case where the vehicle 3 turns to the right on the curved track Xfb in the intersection 30 illustrated in FIG. 10, as compared to the case where the vehicle 3 turns to the right on the arc track Xfc, the degree of closeness of the vehicle to the opposite lane on the first course 31 in the intersection 30 may be suppressed. Especially in the configuration in which the first small curved line section Xfb1 extends from the first predetermined point X1, as compared to the configuration in which the first small curved line section Xfb1 extends from the first intersection Xc1, the length of the first small curved line section Xfb1 along the x axis may be decreased. This may further suppress the degree of closeness of the vehicle to the opposite lane on the first course 31 in the intersection 30.

The first predetermined point X1 is calculated as a point displaced from the first intersection Xc1 in the forward direction of the vehicle 3 by the first offset value Offset1, and the first offset value Offset1 is calculated by searching a map according to the first distance D1 that is the interval between the first boundary line Lb1 and the second straight line L2. Thus, when the vehicle 3 turns to the right/left, the position of the first predetermined point X1 may be properly determined according to the size of the intersection 30 in the forward direction of the vehicle 3.

When the vehicle 3 turns to the left on the curved track Xfb in the intersection 30, due to the shape of the first small curved line section Xfb1, as compared to the configuration in which the traveling track is shaped as an arc, the degree of closeness of the vehicle 3 to the corner in the intersection 30 due to the turning radius differential may be suppressed.

Further, due to the shape of the second small curved line section Xfb2, the curved track Xfb is connected to the second straight line L2 at the second predetermined point X2 while being curved with the curvature smaller than the curvature of an arc inscribed in the first straight line L1 and the second straight line L2. Accordingly, for example, when the traffic division of the vehicle 3 is prescribed as the left-hand traffic, when the vehicle 3 turns to the right on the curved track Xfb determined as described above in the intersection 30, as compared to the case where the vehicle 3 turns to the right on the arc track Xfc, the angle at which the vehicle 3 reaches the second predetermined point X2 may be decreased, thereby reducing a lateral G force applied to occupants when the vehicle enters into the second course 32.

On the contrary, the second predetermined point X2 is calculated as a point displaced from the second course target point Xt toward the back of the second course 32 by the second offset value Offset2, and the second offset value Offset2 is calculated by searching a map according to the second distance D2 that is the interval between the second course target point Xt and the first straight line L1. Thus, when the vehicle 3 turns to the right/left, the position of the second predetermined point X2 may be properly determined according to the size of the intersection 30 in the right/left turn direction of the vehicle 3.

In addition, In the automated drive device 1, the motor 5 and the actuator 6 are controlled such that the vehicle 3 travels on the traveling track Xf thus determined. At this time, when the vehicle 3 travels off the traveling track Xf during right turn in the intersection 30 and the obstacle such as the median strip 32a is present in the forward direction of the vehicle 3, the changed track Xf' is calculated.

The changed track Xf' is calculated as a track connecting the straight track (segment) between the vehicle 3 and the interference avoidance point X3 to the straight track (segment) between the interference avoidance point X3 and the second predetermined point X2. The interference avoidance point X3 is located closer to the intersection 30 than the second predetermined point X2 on the second straight line L2, such that the vehicle 3 may avoid the interference with the obstacle such as the median strip 32a while traveling toward the interference avoidance point X3. By controlling the motor 5 and the actuator 6 such that the vehicle 3 travels on the changed track Xf', the vehicle 3 during right turn may be prevented from interfering with the obstacle such as the median strip 32a.

Further, since the changed track Xf' is calculated as a track connecting the two straight tracks, that is, a track connecting two line segments, the changed track Xf' may be easily calculated, thereby easily changing a track for the vehicle 3 from the traveling track Xf to the changed track Xf'.

In this embodiment, the curved track Xfb including the first small curved line section, the large curved line section, and the second small curved line section is determined using the Bézier curve. However, the curved track Xfb may be determined using any other suitable curve. For example, the curved track Xfb including the first small curved line section, the large curved line section, and the second small curved line section may be determined using a B spline curve.

In the embodiment, the point located at the center of the traveling lane on the second course 32 for the vehicle 3 on the second boundary line Lb2 is set as the second course target point Xt. However, the second course target point of the present disclosure is not limited to this, and may be any target on the second course. For example, a point located at the center of the traveling lane on the second course 32 and in the rear of the second boundary line Lb2 on the second course 32 may be used as the second course target point.

Further, in the embodiment, the first distance D1 is calculated as the interval between the second straight line L2 and the first boundary line Lb1. Alternatively, the first distance D1 may be calculated as the interval between the stop line 31c and the second straight line L2. In that case, the first offset value Offset1 may be calculated according to the first distance D1 that is the interval between the stop line 31c and the second straight line L2.

Further, when the first course 31 and the second course 32 diagonally intersect each other, the first offset value Offset1 and/or the second offset value Offset2 may be determined according to an intersecting angle between the first course 31 and the second course 32.

On the contrary, in the embodiment, the traveling track determination device 1 is applied to determine the traveling track Xf at right/left turn in the intersection 30 of the crossroad. However, the traveling track determination device of the present disclosure is not limited to this, and may be applied to determine the traveling track at traveling of the vehicle from a first course to a second course that is bent and connected to the first course. For example, the traveling track determination device of the present disclosure may determine a traveling track at right/left turn in diagonally intersecting crossroad, L-junction, T-junction, trifurcate road, or multi-forked road.

In the embodiment, the automated drive device 1 and the traveling track determination device 1 of the present disclosure are applied to the four-wheeled vehicle. However, the automated drive device and the traveling track determination device of the present disclosure may be also applied to two-wheeled, three-wheeled, and five or more-wheeled vehicles.

Further, in the embodiment, the median strip 32a is the lane boundary area. However, the lane boundary area of the present disclosure is not limited to this, and may be any boundary area between a lane in the traveling direction of the vehicle and an opposite lane on the second course. For example, an area equipped with a guardrail, a fence, or the like may be the lane boundary area.

In this embodiment, at right turn of the vehicle 3 in the intersection 30, when the median strip 32a that is the lane boundary area is present in the forward direction of the vehicle 3, the curved track Xf is calculated. However, at left turn of the vehicle 3 in the intersection 30, when the median strip 32a that is the lane boundary area is present in the forward direction of the vehicle 3, the traveling track for the vehicle 3 may be changed. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A traveling track determination device that determines a future traveling track for a vehicle when the vehicle travels from a first course toward a second course which is bent relative to and connected to the first course, the traveling track determination device comprising:
    a second course target point acquisition processor that acquires a second course target point that is a target of future traveling on the second course; and
    a traveling track determination processor that determines the future traveling track for the vehicle using:
    (i) a first straight line that extends from the vehicle in a forward direction of the vehicle through a continuous section between the first course and the second course,
    (ii) a second straight line that extends along the second course while passing through the second course target point and intersects with the first straight line in the continuous section,
    (iii) a first small curved line section that extends, while being curved, from a first predetermined point on the first straight line such that a curvature of which gradually increases from a value smaller than a curvature of an arc inscribed in the first straight line and the second straight line in the continuous section,
    (iv) a large curved line section that is connected to and continues from one end of the first small curved line section and extends, while being curved, such that a curvature of which gradually increases to a maximum value larger than the curvature of the arc and gradually decreases from the maximum value, and
    (v) a second small curved line section that is connected to and continues from one end of the large curved line section and extends, while being curved, to a second predetermined point on the second straight line such that a curvature of which gradually decreases from a value of a curvature of the large curved line section at the one end to a value smaller than the curvature of the arc,
    wherein the traveling track determination processor determines the future traveling track such that at least a portion of the first small curved line section, at least a portion of the second small curved line section, and the large curved line section are included in the continuous section,
    wherein the traveling track determination device further comprises a second boundary line acquisition processor that acquires a second boundary line defining a boundary between the second course and the continuous section, wherein
    the traveling track determination processor determines the future traveling track such that the second predetermined point on the second straight line is displaced from a third intersection that is an intersection of the second straight line and the second boundary line to a position located on a second course side of the third intersection which is opposite to a continuous section side of the third intersection.

2. The traveling track determination device according to claim 1, further comprising a first boundary line acquisition processor that acquires a first boundary line defining a boundary between the first course and the continuous section, wherein
    the traveling track determination processor determines the future traveling track such that the first predetermined point on the first straight line is displaced in the forward direction of the vehicle from a first intersection that is an intersection of the first straight line and the first boundary line.

3. The traveling track determination device according to claim 2, wherein
an intersection of the second straight line and the first straight line is a second intersection, and
the traveling track determination processor determines a displacement of the first predetermined point from the first intersection according to a distance between the second intersection and the first intersection.

4. The traveling track determination device according to claim 1, wherein
an intersection of the second straight line and the first straight line is a second intersection, and
the traveling track determination processor determines a displacement of the second predetermined point from the third intersection according to a distance between the second intersection and the third intersection.

5. The traveling track determination device according to claim 1, further comprising:
a lane boundary area acquisition processor that acquires a lane boundary area corresponding to a boundary area between (i) a travel lane on which the vehicle travels in the second course and (ii) an opposite lane in the second course;
a surrounding status data acquisition processor that acquires surrounding status data indicating a surrounding status of the traveling vehicle when the vehicle actually travels according to the future traveling track after determination of the future traveling track; and
a traveling track change processor that changes the future traveling track so as to avoid interference of the vehicle with the lane boundary area when it is determined that the lane boundary area is present in the forward direction of the vehicle based on the acquired surrounding status data.

6. The traveling track determination device according to claim 5, wherein
when the vehicle travels toward the second course while the vehicle crosses an opposite lane of the first course in the continuous section, in a case that the lane boundary area is present in the forward direction of the vehicle,
the traveling track change processor determines a point on the second straight line which is located closer to the intersection of the second straight line and the first straight line relative to the second predetermined point as a third predetermined point, and updates the future traveling track to a track comprising a straight track linking between the vehicle and the third predetermined point and a straight track linking between the third predetermined point and the second predetermined point.

7. The traveling track determination device according to claim 1, wherein
the first small curved line section, the large curved line section, and the second small curved line section are configured of a Bézier curve.

8. The traveling track determination device according to claim 1, wherein the traveling track determination processor determines the future traveling track without using map or map data with respect to the first course, the second course and the continuous section.

9. The traveling track determination device according to claim 8, wherein the second course target point acquisition processor that acquires the second course target point without using the map or the map data with respect to the second course.

10. The traveling track determination device according to claim 1, wherein the continuous section is an inter section of the first course and the second course.

11. The traveling track determination device according to claim 10, wherein the second course comprises at least two lanes including a traveling lane and an opposite lane.

12. A method executed by an on-board computer, the method determining a future traveling track for a vehicle when the vehicle travels from a first course toward a second course which is bent relative to and connected to the first course, the method comprising steps of:
acquiring a second course target point that is a target of future traveling on the second course; and
determining the future traveling track for the vehicle using:
(i) a first straight line that extends from the vehicle in a forward direction of the vehicle through a continuous section between the first course and the second course,
(ii) a second straight line that extends along the second course while passing through the second course target point and intersects with the first straight line in the continuous section,
(iii) a first small curved line section that extends, while being curved, from a first predetermined point on the first straight line such that a curvature of which gradually increases from a value smaller than a curvature of an arc inscribed in the first straight line and the second straight line in the continuous section,
(iv) a large curved line section that is connected to and continues from one end of the first small curved line section and extends, while being curved, such that a curvature of which gradually increases to a maximum value larger than the curvature of the arc and gradually decreases from the maximum value, and
(v) a second small curved line section that is connected to and continues from one end of the large curved line section and extends, while being curved, to a second predetermined point on the second straight line such that a curvature of which gradually decreases from a value of a curvature of the large curved line section at the one end to a value smaller than the curvature of the arc,
wherein the determining step determines the future traveling track such that at least a portion of the first small curved line section, at least a portion of the second small curved line section, and the large curved line section are included in the continuous section,
wherein the determining step further comprising: acquiring a second boundary line defining a boundary between the second course and the continuous section, and
determining the future traveling track such that the second predetermined point on the second straight line is displaced from a third intersection that is an intersection of the second straight line and the second boundary line to a position located on a second course side of the third intersection which is opposite to a continuous section side of the third intersection.

13. A non-transitory computer readable medium storing a program for causing an on-board computer to execute processing to determine a future traveling track for a vehicle when the vehicle travels from a first course toward a second course which is bent relative to and connected to the first course, the processing comprising steps of:
acquiring a second course target point that is a target of future traveling on the second course; and determining the future traveling track for the vehicle using:

(i) a first straight line that extends from the vehicle in a forward direction of the vehicle through a continuous section between the first course and the second course, (ii) a second straight line that extends along the second course while passing through the second course target point and intersects with the first straight line in the continuous section, (iii) a first small curved line section that extends, while being curved, from a first predetermined point on the first straight line such that a curvature of which gradually increases from a value smaller than a curvature of an arc inscribed in the first straight line and the second straight line in the continuous section, (iv) a large curved line section that is connected to and continues from one end of the first small curved line section and extends, while being curved, such that a curvature of which gradually increases to a maximum value larger than the curvature of the arc and gradually decreases from the maximum value, and (v) a second small curved line section that is connected to and continues from one end of the large curved line section and extends, while being curved, to a second predetermined point on the second straight line such that a curvature of which gradually decreases from a value of a curvature of the large curved line section at the one end to a value smaller than the curvature of the arc, wherein the determining step determines the future traveling track such that at least a portion of the first small curved line section, at least a portion of the second small curved line section, and the large curved line section are included in the continuous section, wherein the determining step further comprising: acquiring a second boundary line defining a boundary between the second course and the continuous section, and determining the future traveling track such that the second predetermined point on the second straight line is displaced from a third intersection that is an intersection of the second straight line and the second boundary line to a position located on a second course side of the third intersection which is opposite to a continuous section side of the third intersection.

* * * * *